United States Patent
Lin et al.

(10) Patent No.: US 7,440,006 B2
(45) Date of Patent: Oct. 21, 2008

(54) SYSTEM FOR GRACEFULLY AGING INACTIVE AREAS OF A VIDEO DISPLAY

(75) Inventors: Chia-Liang Lin, Union City, CA (US); Chih-Hsien Chou, San Jose, CA (US)

(73) Assignee: Realtek Semiconductor Corp., HsinChu (TW)

( * ) Notice: Subject to any disclaimer, the term of this patent is extended or adjusted under 35 U.S.C. 154(b) by 556 days.

(21) Appl. No.: 11/099,955

(22) Filed: Apr. 5, 2005

(65) Prior Publication Data

US 2006/0221186 A1   Oct. 5, 2006

(51) Int. Cl.
 *H04N 3/20* (2006.01)
 *H04N 5/46* (2006.01)
(52) U.S. Cl. .................. 348/173; 348/556; 348/445
(58) Field of Classification Search .............. 348/173, 348/441, 445, 556, 558, 458, 449, 913, 469, 348/687
See application file for complete search history.

(56) References Cited

U.S. PATENT DOCUMENTS

| | | | |
|---|---|---|---|
| 5,193,006 A * | 3/1993 | Yamazaki | |
| 5,291,295 A * | 3/1994 | Srivastava | |
| 6,262,772 B1 * | 7/2001 | Shen et al. | |
| 6,359,398 B1 * | 3/2002 | Nakajima et al. | |
| 6,429,894 B1 * | 8/2002 | Hicks | |
| 7,084,924 B2 * | 8/2006 | Topper et al. | 348/445 |
| 7,129,992 B2 * | 10/2006 | Barnichon | 348/556 |
| 7,245,316 B2 * | 7/2007 | Grimes et al. | 348/173 |

* cited by examiner

*Primary Examiner*—Trang U Tran
(74) *Attorney, Agent, or Firm*—Winston Hsu

(57) ABSTRACT

When a video display system displays an image having an aspect ratio that differs from the aspect ratio of the system's display monitor, the image spans only an "active" portion of the available display area on the monitor. The display system sets the luminance and/or chrominance of pixels in the inactive areas of the monitor to match the average luminance and/or chrominance of a selected group of pixels forming the image in the active area. This helps prevent ghosting by aging the phosphors or other material forming the pixels in the active and inactive areas at the same rate.

30 Claims, 6 Drawing Sheets

SYSTEM FOR GRACEFULLY AGING INACTIVE AREAS OF A VIDEO DISPLAY

BACKGROUND OF THE INVENTION

1. Field of the Invention

The present invention relates to a system for generating a video display and in particular to a system for gracefully aging unused areas of a video display.

2. Description of Related Art

As illustrated in FIG. 1, the HDTV (high definition television) television monitor displays a video image with a 16:9 aspect ratio (width to height) while older television monitors display video images with a 4:3 aspect ratio as illustrated in FIG. 2. Since most video sources continue to use the traditional 4:3 aspect ratio, it is necessary to make a compromise when processing a video signal conveying 4:3 aspect ratio video content to produce a display on a 16:9 aspect ratio HDTV video monitor.

As shown in FIG. 3, one approach is to stretch the 4:3 aspect ratio image horizontally to fill the 16:9 aspect ratio display area, but this distorts the image. Another approach is to clip the top and/or bottom of the 4:3 aspect ratio image to fit in the 16:9 aspect ratio display monitor as illustrated in FIG. 4, but this can cause an objectionable loss of part of the image.

One common approach, as shown in FIG. 5 is to display the image with the correct 4:3 aspect ratio in an active region 12 of 16:9 ratio display monitor, leaving areas 10 and 11 to the left and right of the active display area 12 unused. The unused screen areas 10 and 11 are usually made white as illustrated in FIG. 5, black as illustrated in FIG. 6, or some constant shade of gray. When the HDTV monitor is based on CRT (cathode ray tube) technology, such long term display of an unchanging image in the unused areas 10 and 11 of the display causes electron beams to continuously strike the same phosphor pixels on the screen, and they can eventually become noticeably less bright than phosphor pixels in the active area of the display. This phosphor burn-in produces a permanent—ghosting—in the unused areas 10 and 11 of the video display that will be visible when viewing 16:9 aspect ratio video content.

A similar problem arises in the context of a CRT personal computer monitor, which can suffer phosphor burn-in when left for long periods displaying an unchanging image. A screen saver resolves this problem by displaying a moving pattern on the monitor upon detecting that the monitor has displayed an unchanging image for some minimum period. When a monitor displays a moving pattern, electron beams will strike each pixel on the screen only sporadically and somewhat randomly so that all phosphor pixels on the screen tend to age more evenly and gracefully, thereby preventing screen ghosting.

Various approaches have been used for solving the uneven display aging problem in televisions and other video applications in which only a part of the display area of a monitor is used to display moving video images, as shown, for example in FIGS. 5 and 6. U.S. Pat. No. 6,359,398 issued Mar. 12, 2002 to Nakajima et al teaches to prevent uneven phosphor aging by duplicating within the inactive areas of a display, a portion of the video source shown in the active area of the display. This does prevent uneven phosphor aging, but it produces an unpleasant double-vision effect in the display. U.S. Pat. No. 5,291,295, issued Mar. 1, 1994 to Srivastava, teaches a method for equalizing the phosphor aging wherein unused areas to the right and left of an active display area are each divided into three sections. A video processing system then adjusts the illumination level of each section as a function of the illumination levels of adjacent areas of the active portion of the screen. U.S. Pat. No. 6,429,894 issued Aug. 6, 2002 to Hicks teaches to prevent uneven phosphor aging by using a sensor to monitor the illumination levels and/or other aging indicators in the active area of a display while a monitor is in use, calculating an amount and time to illuminate inactive areas of the display needed to compensate for the aging of the active area, and then illuminating the inactive areas while the monitor is not in use. This method allows the inactive areas of the display to remain dark while the monitor is being used, but it requires a sensor external to the monitor and requires the monitor to be left on when not in use so that the aging system can age the inactive areas of the display, thereby increasing energy consumption. U.S. Pat. No. 5,193,006, issued Mar. 9, 1993 to Yamazaki teaches to reduce ghosting by monitoring the brightness level of the active portions of a CRT display using an automatic brightness limiter driven by a fly back transformer and adjusting the brightness level of the inactive areas of the display to be approximately equal to the average brightness in the active area of the display. Alternatively, Yamazaki teaches to continuously move the active area in the display so that no area of the display remains continuously inactive. This helps to smoothes phosphor aging over the entire display but areas of the display near its edges still age differently from areas of the display near its center, since the center areas of the display are always active. U.S. Pat. No. 6,262,772 issued Jul. 17, 2001 to Shen et al teach to eliminate ghosting by stretching the active area to fill the entire display as illustrated, for example in FIG. 3. However, this method distorts the displayed image.

What is needed is a system for gracefully aging phosphors in inactive areas of a video display in a way that does not distort displayed images with producing distracting or unaesthetic images in the inactive areas, and without requiring the use of sensors external to the monitor.

BRIEF SUMMARY OF THE INVENTION

When a video display system in accordance with the invention displays an image having an aspect ratio differing from the aspect ratio of the system's display monitor, the image spans only an active area of the available display area on the monitor and does not extend into inactive areas of the display. The display system processes pixel data controlling the luminance and/or chrominance of the active area of the display to determine an average luminance and/or chrominance of selected pixels within the active area and sets the luminance and/or chrominance of pixels in the "—inactive—" areas of the monitor as a function of the determined average luminance and/or chrominance. Thus as the average luminance and/or chrominance of pixels in the active area change, so to does the luminance and/or chrominance of pixels in the inactive areas This helps prevent ghosting by aging the phosphors or other material forming the pixels in the active and inactive areas at substantially the same rate.

The claims appended to this specification particularly point out and distinctly claim the subject matter of the invention. However those skilled in the art will best understand both the organization and method of operation of what the applicant(s) consider to be the best mode(s) of practicing the invention, together with further advantages and objects of the invention, by reading the remaining portions of the specification in view of the accompanying drawing(s) wherein like reference characters refer to like elements.

DETAILED DESCRIPTION OF THE INVENTION

The present invention relates to a system for gracefully aging inactive portions of a CRT, LCD, plasma or other type of video display. While the specification describes several example embodiments of the invention considered best modes of practicing the invention, it should be understood that the invention can be implemented in many way and is not limited to the particular examples described below or to the particular manner in which any features of such examples are implemented.

Figure 1:
FIGS. 1-6 depict video displays produced by various prior art video display systems.
Figure 2:
Figure 3:
Figure 4:
Figure 5:
Figure 6:
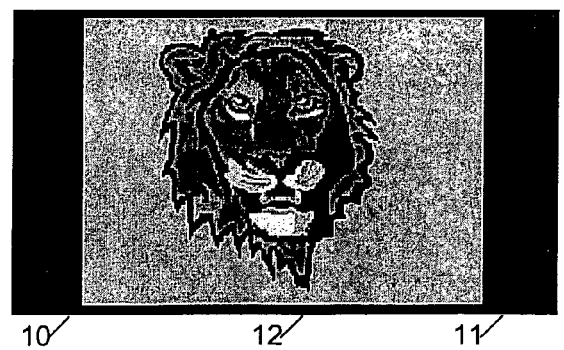

The invention relates to a video system capable of displaying an image on a display monitor when the image and the display monitor have differing aspect ratios. For example, the image may have a 4:3 aspect ratio as illustrated in FIG. 2 while the display monitor has a 16:9 aspect ratio as illustrated in FIG. 1. Some prior art display systems typically produce displays such as illustrated in FIG. 5 or 6 where the image is displayed with the correct aspect ratio in an active area 12 of the display, while the pixels forming inactive areas of the display 10 and 11 into which the image does not extend are set to some uniform color and brightness. FIG. 5 shows a prior art example in which the inactive areas 10 and 12 are white, FIG. 6 shows an example in which the inactive areas 10 and 11 are black. Other systems may set inactive areas to some uniform shade of gray.

A conventional video signal conveying an image that changes over time consists of a luminance component and a chrominance that can be converted into two pixel data sequences. The magnitude of each element of one pixel data sequence controls the luminance of a separate one of the pixels forming the image and the magnitude of another element of the pixel data sequence controls the pixel's chrominance. Rather than setting pixels within the inactive areas to a constant color and brightness, a display system in accordance with the invention processes the pixel data sequences controlling the active area of the display to produce additional pixel data for controlling the luminance and chrominance of pixels in the inactive area of the display. The additional pixel data sets varies the luminance of each pixel in the inactive areas 10 and 11 so that it has approximately the same time-averaged magnitude as selected pixels in the active area 12. This prevents uneven aging of the phosphors or other materials forming pixels in the active and inactive regions of the display. In some embodiments of the invention, the additional pixel data also sets the chrominance of each pixel in the inactive area so that it has approximately the same time-averaged magnitude as selected pixels in the active area. For example in FIG. 7, the luminance and chrominance of pixels in inactive areas 10 and 11 of the display are periodically adjusted to approximate the average luminance and chrominance of selected pixels in the active area 12.

In other embodiments of the invention, the second pixel data sets the luminance of pixels in the inactive areas 10 and 11 to match the average luminance of selected pixels in active area 12, but sets the chrominance of pixels in the inactive area to a constant value irrespective of the chrominance of pixels in active area 12. Thus for example all pixels in the inactive area 10 and 11 remain a constant shade of grey regardless of the color of pixels in the active area, but have a brightness that varies with the average brightness of selected pixels in active area 12.

Figure 7:
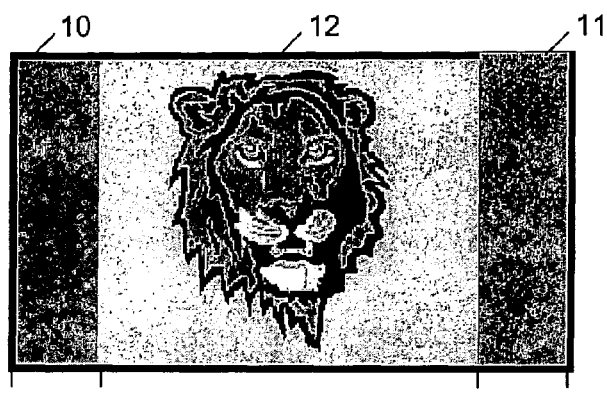
FIG. 7 depicts a video display produced by a video system in accordance with one embodiment of the invention.
Figure 8:
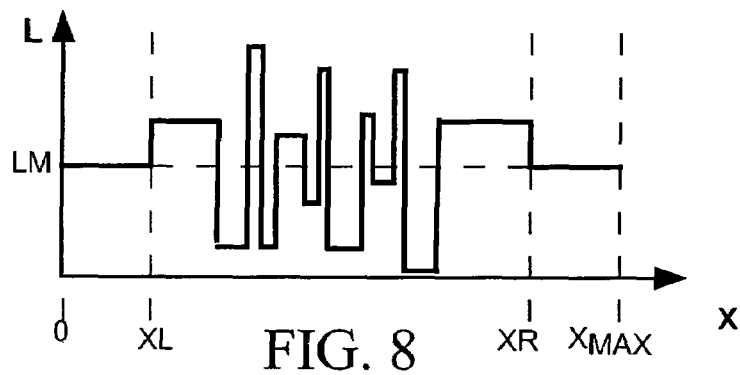
FIG. 8 graphically depicts pixel luminance along one row of pixels of the display of FIG. 7.

FIG. 8 is a graph showing pixel luminance L along one horizontal row of pixels in the display of FIG. 7 as a function of distance X from the right edge of the display border. The luminance for pixels in inactive areas 10 and 11 (between 0 and XL and between XR and XMAX) and is LM, an estimated average luminance of selected pixels in active area 12. The luminance of pixels in active area 12 between XL and XR is controlled by the video signal. In a similar manner, the chrominance of the pixels in the inactive areas 10 and 11 is also uniform at any given time and set to an estimated average of the chrominance of selected pixels in the active area. In the preferred embodiment of the invention, the average luminance or chrominance in the active area 12 is computed as the mean pixel luminance or chrominance of a representative sample of pixels in active area 12 over some number N of the most recent frames of the display, where N may be equal to 1 or more. The representative pixels consist of every $i^{th}$ pixel along every $j^{th}$ row of the active area, where i and j are integers greater than 0.

In alternative embodiments of the invention, the pixels within active area 12 whose average luminance or chrominance is to be computed may be selected in other ways. For example, all pixels in active area 12 may be selected, or only pixels in active area 12 that are near inactive areas 10 and 11 may be selected. While in the preferred embodiment of the invention, the average luminance or chrominance of the selected pixels is computed as the mean luminance or chrominance of the selected pixels, in alternative embodiments of the invention, the average luminance or chrominance of the selected pixels may be computed as the median or mode luminance or chrominance of the selected pixels.

Figure 9:
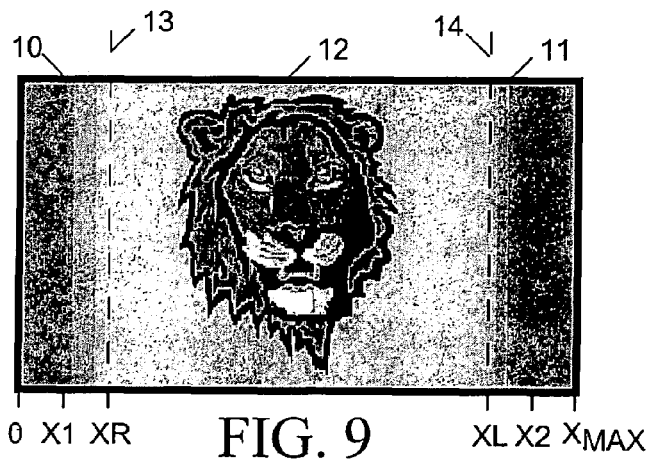
FIG. 9 depicts a video display produced by a video system in accordance with another embodiment of the invention.
Figure 10:
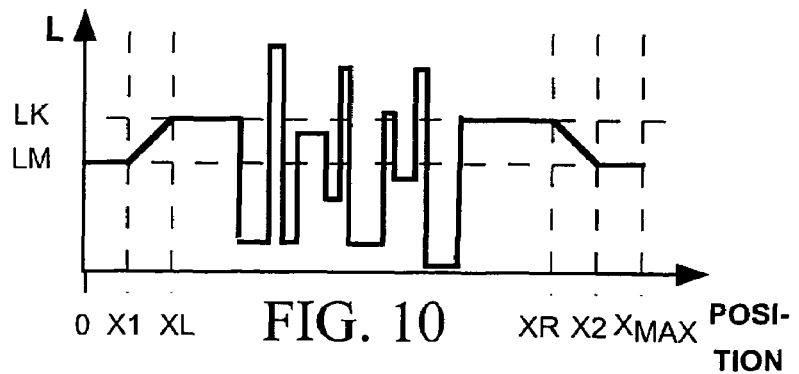
FIG. 10 graphically depicts pixel luminance along one row of pixels of the display of FIG. 9.

In the preferred embodiment of the invention, the luminance and chrominance of every pixel in inactive areas 10 and 11 is set to the average luminance and chrominance of the selected pixels in active area 12. However, as illustrated in FIG. 9, in other embodiments of the invention, the sharpness of transitions at the borders 13 and 14 between the active and inactive areas of the display is reduced by tapering pixel luminance within inactive areas 10 and 11 as illustrated in FIG. 10. FIG. 10 shows that pixel luminance in areas 10 and 11 at points XL and XR near active area 12 (between X1 and XL and between XR and X2) is made similar to the luminance LK of pixels on the borders 13 and 14 of active area 12. Pixels more remote from active area 12 (between 0 and X1 and between X2 and $X_{MAX}$) have luminance similar to the average luminance LM of all pixels in area 12. Between X1 and XL and between XR and X2, pixel luminance changes linearly with distance between LM and LK. Such tapering of luminance in the inactive areas 10 and 11 reduces the abruptness of the change in brightness between the active and inactive areas of the display. The width of the tapered areas X2-XR and XL-X1 can be made as wide or as small as necessary to be aesthetically pleasing. While FIG. 10 shows that the pixel luminance transitions between X1 and XL and between XR and X2 is a suitably a linear function of distance, in some embodiments of the invention pixel luminance in the inactive areas can taper as another function of pixel distance from the active area, such as for example, a quadratic function.

When pixel luminance tapers in inactive areas 10 and 11 as illustrated in FIGS. 9 and 10, the pixel chrominance in the inactive areas may taper in a similar manner, may be set to the average chrominance of selected pixels in active area 12, or may be set to some constant value that is independent of chrominance of pixels in active area 12.

Video System Architecture

Figure 11:
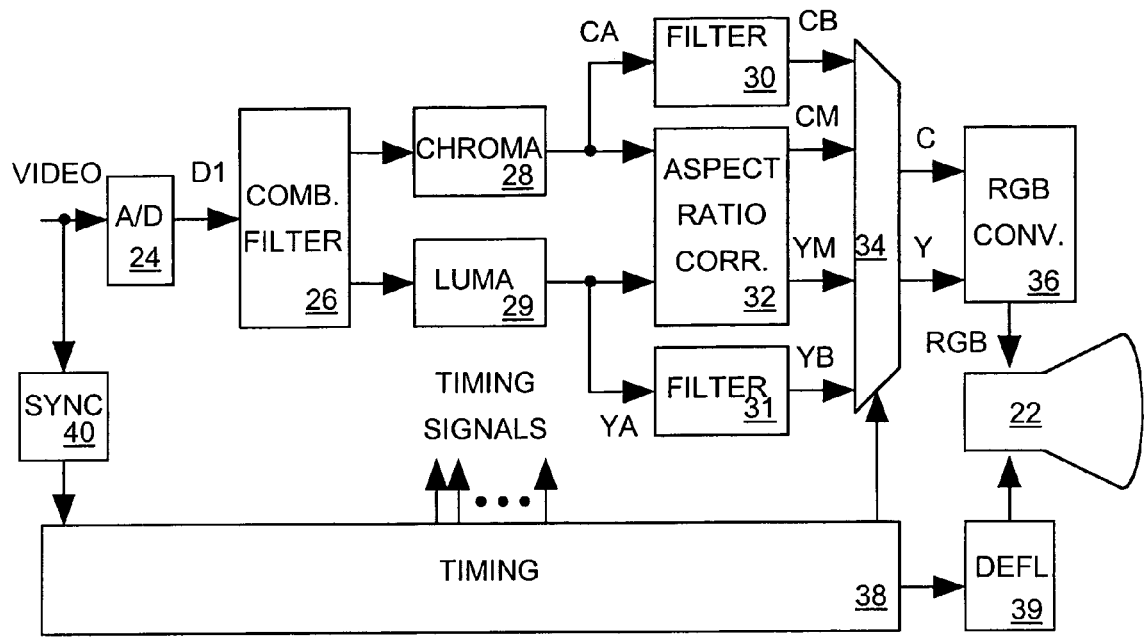
FIG. 11 depicts in block diagram form an example video display system in accordance with the invention.
Figure 12:
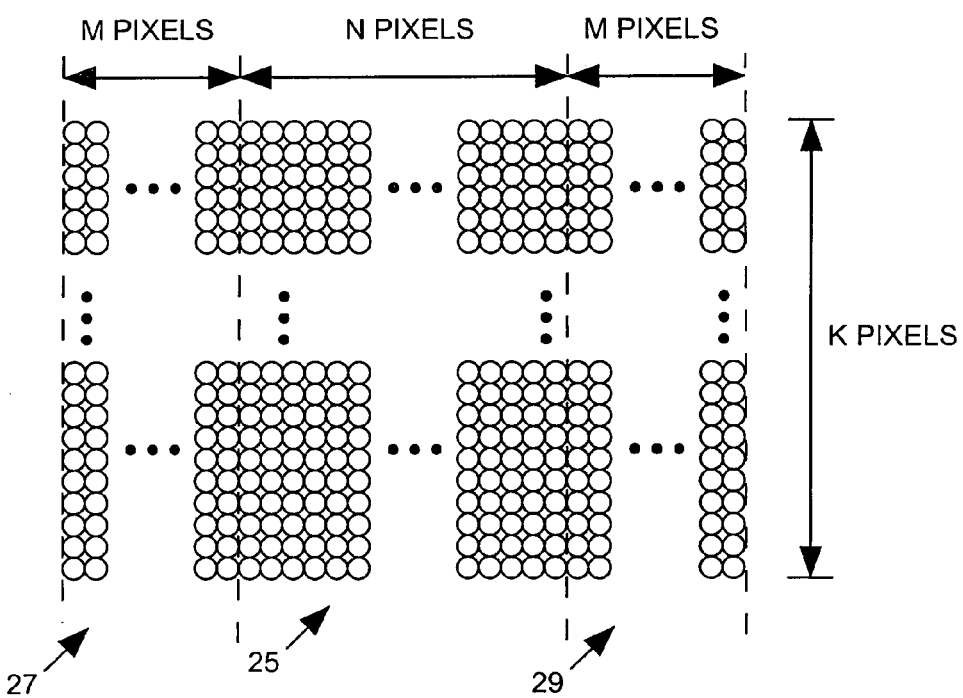
FIG. 12 is a simplified plan view of a pixel-based video display.

FIG. 11 is a block diagram of an example video system 20 in accordance with the invention for generating a display on a monitor 22 in response to an input video signal (VIDEO) when the aspect ratio of a moving image conveyed by the video signal and the aspect ratio of the monitor 22 differ. For example, the video signal may convey an image with a 4:3 aspect ratio as illustrated in FIG. 2, while monitor 22 may have a 16:9 aspect ratio as illustrated in FIG. 1. In such case, monitor 22 provides a display having K rows of N+2M pixels as shown in FIG. 12, having an aspect ratio of (N+2M)/K=16:9. The 4:3 aspect ratio image conveyed by the VIDEO signal appears in the active N×K pixel area of the display where N/K=4:3. While generating the moving image display in an active area 25, video system 20 also periodically adjusts the luminance and chrominance of pixel in the two M×K pixel inactive areas 27 and 29 to gracefully age those areas of the display to prevent ghosting.

Video system 20 includes an analog-to-digital (A/D) converter 24 for digitizing the incoming VIDEO signal to produce a digital data sequence D1. A comb filter 26, a chroma filter 28 and a luma filter 21 convert the D1 data sequence into two pixel data sequences CA and YA. Each successive pair of CA and YA data sequence elements defines the luminance and chrominance of a separate pixel within the active display area 25. Filters 28 and 21 generate the elements of sequences CA and YA periodically at a rate that would be needed if the image were to be displayed on 4:3 aspect ratio display. However, since the image is to be displayed on a 16:9 aspect ratio display, the data conveyed by the CA and YA sequences will be needed in bursts rather than continuously. For example, when monitor 22 is a cathode ray tube (CRT) monitor, electron beams scan horizontally across the screen successively updating the color of each pixel along a row. Chroma and luma filters 28 and 21 supply N elements of each of the CA and YA sequences while the beam sweeps across an entire N+2M pixel row. However, those N sequence elements are needed at a higher rate only as the beam sweeps across the N pixels of a row within active area 25. Thus an aspect ratio corrector circuit 32 includes first-in, first out (FIFO) buffers for continuously storing CA and YA sequence elements at the rate at which chroma and luma filters 28 and 21 generate them, and for reading them out as the CM and YM sequence elements at the rate needed for controlling pixel chrominance and luminance while the beam sweeps across pixels in active area 25.

Video system 20 also includes a pair of digital filters 30 and 31 for processing the CA and YA sequences to generate the additional chrominance and luminance pixel data sequences CB and YB for controlling pixel color and brightness while the beam sweeps across pixels in inactive areas 27 and 29. A multiplexer 34 passes the CM and YM sequences elements as the chrominance and luminance data input C and Y of an RGB converter 36 while the beam sweeps pixels in active area 25. Multiplexer 34 passes the CB and YB sequence elements as the C and Y inputs to RGB converter 36 while the beam sweeps pixels in inactive areas 27 and 29. RGB converter 36 converts the C and Y sequence elements into RGB signals for controlling the brightness of electron beams sweeping red, green and blue pixels in the display produced by CRT 22. A timing circuit 38 provides timing signals for clocking operations of devices 21, 24, 26, 28, 30, 31, 32, and 36 and for clocking a deflection circuit 39 controlling the position of the CRT beam. A conventional synchronizing circuit 40 processes the VIDEO signal to produce signals for synchronizing the timing signals produced by timing circuit 38.

Filters 30 and 31 calculate the value of each element of the CB or YB sequence as functions of values of selected elements of the incoming CA or YA sequence. The function that filter 30 implements ensure that pixels in the inactive areas 27 and 29 of the display have approximately the same average luminance over time as selected pixels residing in active area 25. Similarly, the function filter 31 implements may ensure that pixels in inactive areas 27 and 29 have approximately the same average chrominance as selected pixels in active area 25. This allows pixels in inactive areas 27 and 29 to age gracefully in that they age at the same rate as pixels in active area 25. The timing signals timing circuit 38 provides to filters 30 and 31 select the pixels in the active area 25 for which chrominance or luminance are to be averaged for purposes of determining chrominance or luminance of pixels in the inactive areas, by selecting corresponding elements of the CM and YM sequences whose magnitudes filters 30 and 31 are to average.

Filter Functions

The functions filters 30 and 31 implement when converting CA and YA pixel data sequences into CB and YB pixel data sequences determine the manner in which pixel chrominance and luminance in inactive areas 27 and 29 are selected so as to gracefully age the pixels in those areas of the display. In various embodiments of the invention, filters 30 and 31 may alternatively implement the functions discussed below. Filters 30 and 31 may implement analogous or differing functions.

Uniform Averaged Chrominance

A frame displayed on monitor 22 is a single (2M+N)×K pixel still image, and video system 20 periodically updates the N×K portion of the image displayed in active area 25 on a frame-by-frame basis to produce the appearance of a moving image. At the same time, video system 20 also updates the display in inactive areas 27 and 29 to gracefully age them. In some embodiments of the invention, filter 30 calculates the value of each element of the CB sequence as the average of values of elements of the CA sequence controlling selected pixels within some number F of previously occurring frames so that the pixels residing in inactive areas 27 and 29 uniformly have the same average chrominance of pixels residing within active area 25 during that set of F frames. F may be any integer larger than 0.

The manner in which filter 30 selects pixels can differ in various embodiments of the invention. For example, the selected pixels alternatively may include every pixel in the active area of all F frames, may include only a representative sample of the pixels in the active area of all F frames, or may include only pixels in portions of the active area that are proximate to the inactive areas. For example, filter 30 may average chrominance only of the column of pixels along the left and right edges of active area 25 next to inactive areas 27 and 29.

Figure 13:
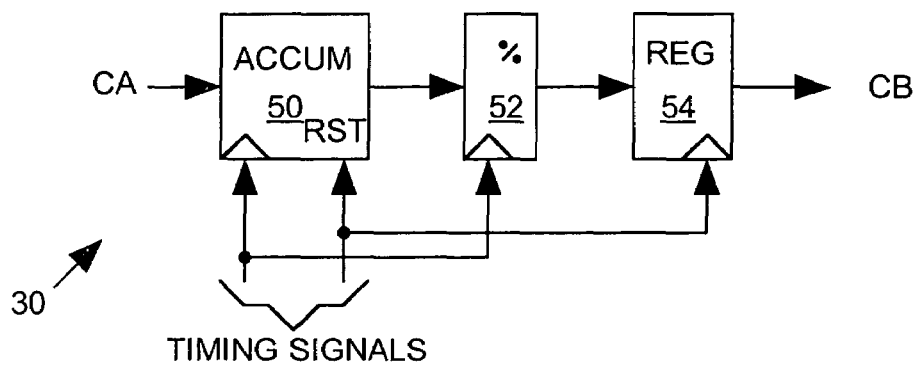
FIGS. 13 and 14 depict in block diagram form example implementations of the filters of FIG. 11.

The average chrominance of the selected pixels may be computed as the mean, median or mode of the pixel chrominance. For example, as illustrated in FIG. 13, a filter that finds the mean chrominance of selected pixels can be implemented using an accumulator 50 for accumulating values of selected CA sequence elements, a divider circuit 52 for scaling the accumulator output data to produce a CB data value, and a register 54 for holding a last computed CB data value while a next CB data value is being computed One timing signal from timing signal generator 38 of FIG. 11 tells accumulator 50 which elements of the CA sequence to accumulate and clocks divider circuit 52. Another timing signal, marking the beginning of each set of F frames, resets accumulator 50 and clocks register 54. Thus during each set of F frames, all elements of the CB pixel data sequence have the same magnitude, the average magnitude of selected CA sequence elements occurring during the preceding set of F frames. Thus, the chrominance of pixels in inactive areas 27 and 29 will be uniform during each set of F frames and equal to the mean chrominance of selected pixels in active area 25 during a preceding set of F frames.

Uniform Averaged Luminance

In some embodiments of the invention, filter 31 of FIG. 11 calculates the magnitude of each element of the YB sequence as the average magnitude of selected elements of the YA sequence occurring during some number G of consecutive frames so that the pixels residing in inactive areas 27 and 29 have the average luminance of pixels residing within active area 25 during the preceding G frames, were G may be any integer larger than 0. The average may be computed, for example, as the mean, median or mode.

Figure 14:
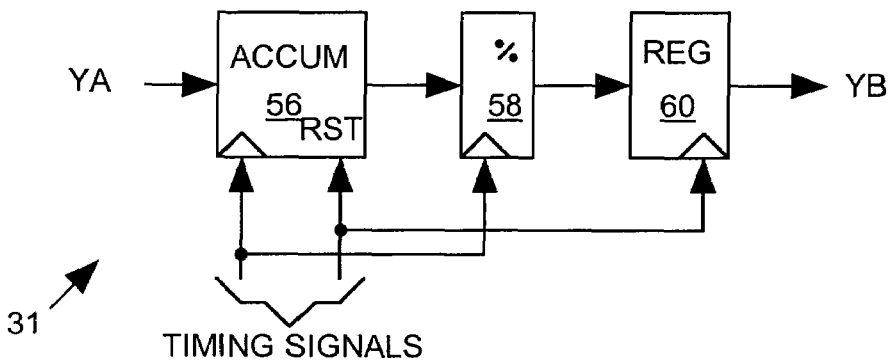

For example, as illustrated in FIG. 14, a version of filter 31 that computes a mean includes an accumulator 56 for accumulating values of selected YA sequence elements during successive sets of G frames, a divider circuit 58 for scaling the accumulator output data to produce the YB data value, and a register 60 for holding the YB data value computed after each set of G frames One timing signal from timing signal generator 38 of FIG. 11 tells accumulator which elements of the YA sequence to accumulate and clocks divider circuit 58 while another timing signal, marking the beginning of each set of G frames, resets accumulator 56 and clocks register 60.

Tapered Chrominance

Figure 15:
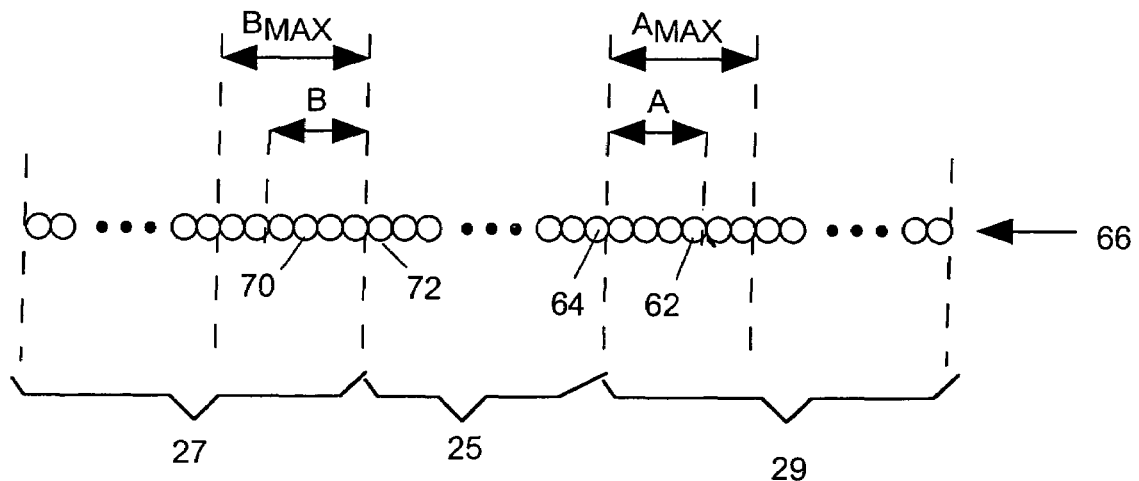
FIG. 15 is an simplified view of a row of pixels of the display of FIG. 9.

FIG. 15 illustrates one row 66 of pixels 66 of the pixel array forming the display of FIG. 12. In some embodiments of the invention, filter 30 of FIG. 11 computes the chrominance CB(A) of the pixel 62 residing in any $A^{th}$ pixel position along any row 66 in area 29 to the right of the pixel 64 on the right edge of active area 25 and computes the chrominance CB(B) of the pixel 70 residing in any $B^{th}$ pixel position along any row 66 in area 27 to the left of the pixel 72 on the left edge of active area 25 in accordance with the following functions:

$$CB(A)=(CB'-CBR(0))(A/A_{max})^{T1}+CBR(0), \text{ for } A<A_{max}$$

$$CB(A)=CB' \text{ for } A>=A_{max}$$

$$CB(B)=(CB'-CBL(0))(B/B_{max})^{T1}+CBL(0), \text{ for } B<B_{max}$$

$$CB(B)=CB' \text{ for } B>=B_{max}$$

where $A_{max}$ is the distance from the right edge of the display over which the chrominance tapers, CBR(0) is the most recently determined chrominance of the pixel 64 on the right edge of the active display area 25 (FIG. 12) along that row, CB' is the most recently computed average chrominance of selected pixels within active area 25.

$B_{max}$ is the distance from the left edge of the display over which the chrominance should taper, CBL(0) is the most recently computed chrominance of the pixel 72 on the left edge of the active display area 25 (FIG. 12), and T1 is any number such that T1>0.

For example, setting T1=2 causes chrominance CB(A) and CB(B) in areas 29 and 27 to taper quadradically from CBR(0) or CBL(0) to CB' as A increases from 0 to $A_{max}$ or as B increases from 0 to $B_{max}$. Setting T1=1 causes chrominance CB(A) and CB(B) in areas 29 and 27 to taper linearly from CBR(0) or CBL(0) to CB' as A increases from 0 to $A_{max}$ or as B increases from 0 to $B_{max}$.

CB' may be the mean, median or mode of the chrominance of the selected pixels within active area 25, and as discussed above, varying strategies may be employed to select the pixels.

Figure 16:
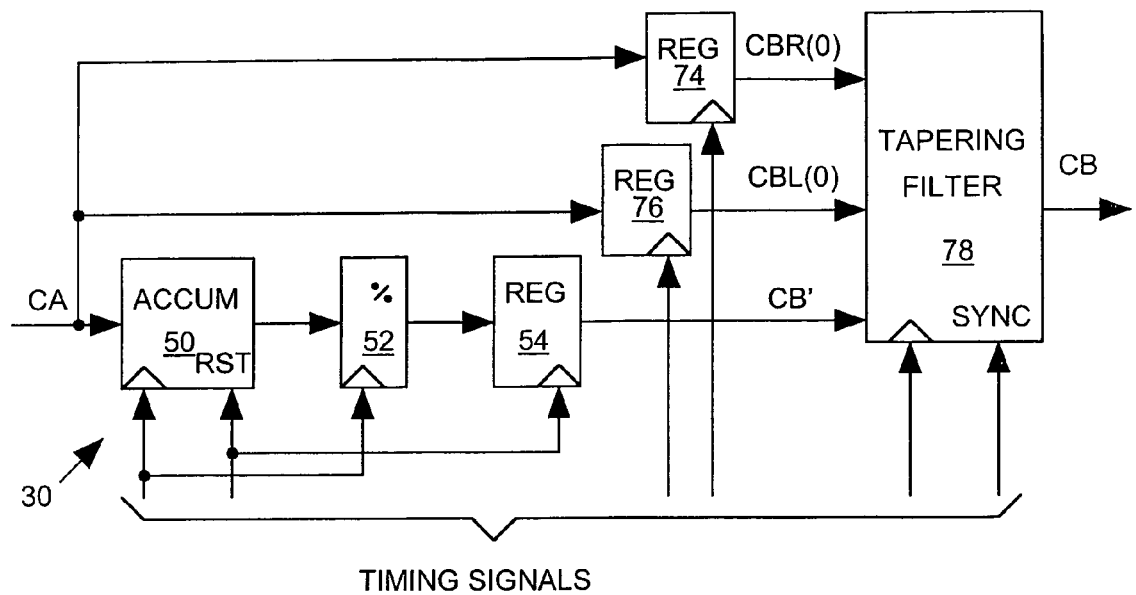
FIGS. 16 and 17 depict in block diagram form example implementations of the filters of FIG. 11.

FIG. 16 depicts a version of filter 30 for providing a tapered chrominance that includes an accumulator 50, divider circuit 52 and register 54 similar to those of FIG. 13 for computing the mean chrominance CB' of pixels in the active area 25 during successive sets of F frames. In this example filter 30 includes a pair of registers 74 and 76 for storing the most recent values of CBR(0) and CBL(0) and a tapering filter 78 receiving CB', CBR(0) and CBL(0) for computing CB in accordance with any of the above described tapering function. Timing signals from timing circuit 38 of FIG. 11 clock registers 74 and 76 so that they store CBR(0) and CBL(0) values as they appear in the CA sequence.

The timing signals also clock tapering circuit 78 when it is to produce each CB value and synchronize tapering filter 78 so that it knows the horizontal position of the pixel for which it is currently computing the magnitude of CB.

Tapered Luminance

In some embodiments of the invention, filter 31 of FIG. 11 computes the luminance YB(A) of the pixel 62 residing in any $A^{th}$ pixel position along any row 66 in area 29 to the right of the pixel 64 on the right edge of active area 25 and computes the luminance YB(B) of the pixel 70 residing in any $B^{th}$ pixel position along any row 66 in area 27 to the left of the pixel 72 on the left edge of active area 25 in accordance with the following functions:

$$YB(A)=(YB'-YBR(0))(A/A_{max})^{T2}+YBR(0), \text{ for } A<A_{max}$$

$$YB(A)=YB' \text{ for } A>=A_{max}$$

$$YB(B)=(YB'-YBL(0))(B/B_{max})^{T2}+YBL(0), \text{ for } B<B_{max}$$

$$YB(B)=YB' \text{ for } B>=B_{max}$$

where $A_{max}$ is the distance from the right edge of the display over which the luminance tapers, YBR(0) is the most recently determined luminance of the pixel 64 on the right edge of the active display area 25 (FIG. 12) along that row, YB' is the most recently computed average luminance of selected pixels within active area 25.

$B_{max}$ is the distance from the left edge of the display over which the luminance should taper, YBL(0) is the most recently computed luminance of the pixel 72 on the left edge of the active display area 25 (FIG. 12), and T2 is any number such that T2>0.

For example, setting T1=2 causes luminance YB(A) and YB(B) in areas 29 and 27 to taper quadradically from YBR(0) or YBL(0) to YB' as A increases from 0 to $A_{max}$ or as B increases from 0 to $B_{max}$. Setting T2=1 causes luminance YB(A) and YB(B) in areas 29 and 27 to taper linearly from YBR(0) or YBL(0) to YB' as A increases from 0 to $A_{max}$ or as B increases from 0 to $B_{max}$YB' may be the mean, median or mode of the luminance of the selected pixels within active area 25, and as discussed above, varying strategies may be employed to select the pixels.

Figure 17:
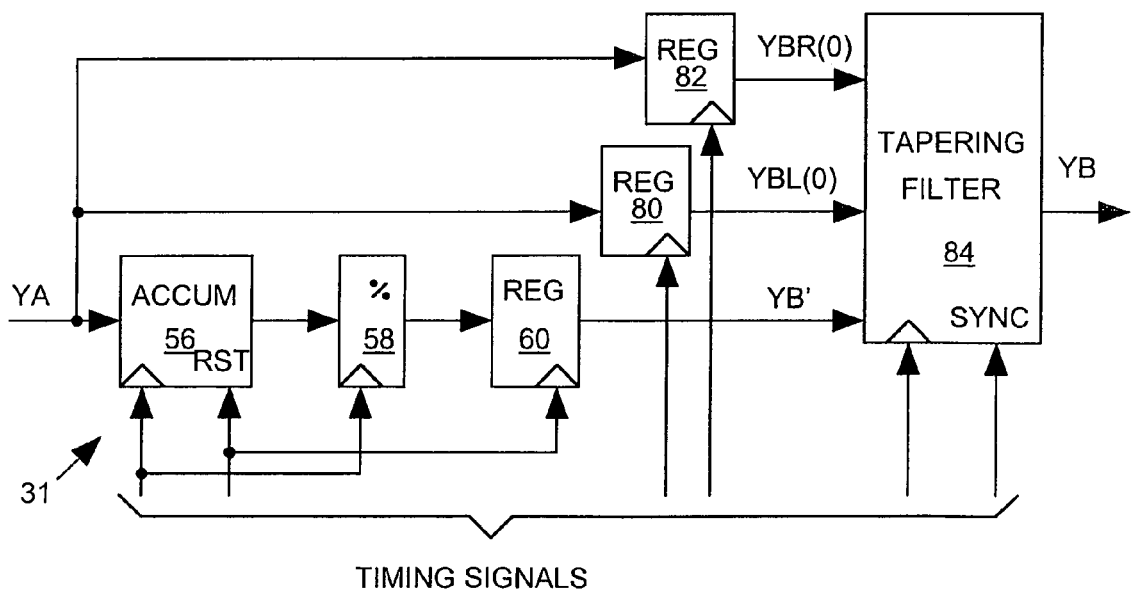

FIG. 17 depicts a version of filter 31 for providing a tapered luminance that includes an accumulator 56, divider circuit 58 and register 60 similar to those of FIG. 14 for computing the mean luminance YB' of pixels in the active area 25 during successive sets of F frames. In this example filter 31 includes a pair of registers 80 and 82 for storing the most recent values of YBR(0) and YBL(0) and a tapering circuit 84 receiving YB', YBR(0) and YBL(0) for computing YB in accordance with any of the above described tapering functions. Timing signals from timing circuit 38 of FIG. 11 clock registers 80 and 82 so that they store YBR(0) and YBL(0) values at the appropriate time. The timing signals also clock tapering circuit 84 to tell it when to produce each new value of YB, and synchronize tapering circuit 84 so that it knows the horizontal position of the pixel for which YB is currently being computed.

Constant Chrominance, Variable Luminance

Figure 18:
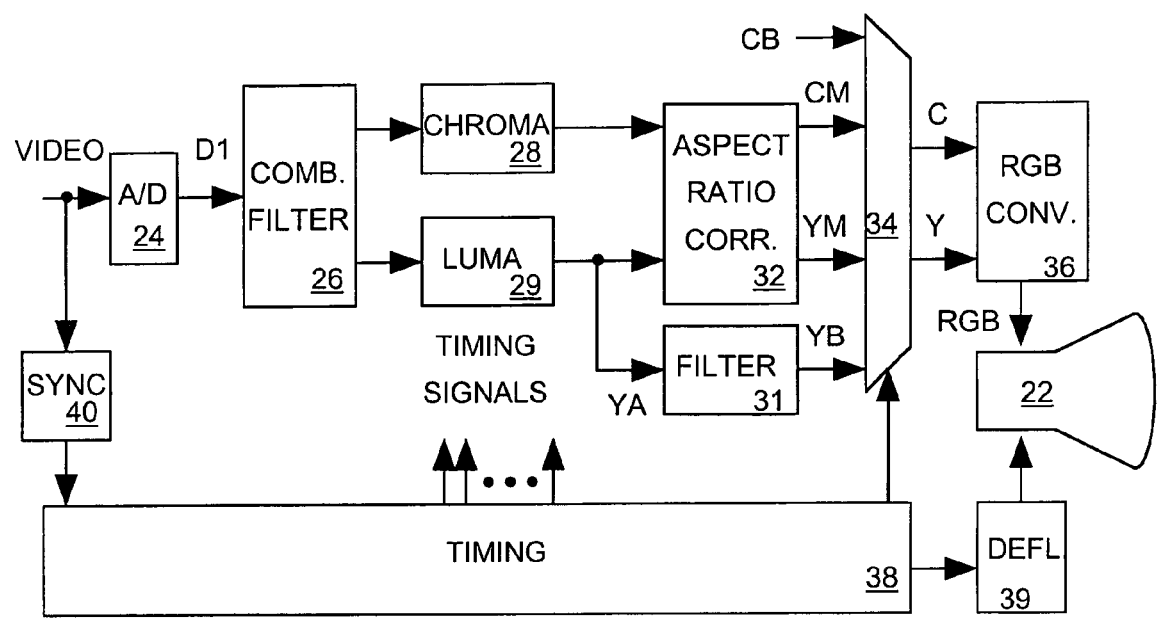
FIG. 18 depicts in block diagram form another example video display system in accordance with the invention.

FIG. 18 illustrates an alternative embodiment of the invention that is similar to FIG. 11 except that filter 30 is removed and the chrominance CB is hard wired (or obtained from a registers) so that CB has a constant value. Thus, the chrominance of all pixels forming the inactive areas of the video display is set to a constant value while filter 31 varies the luminance of the pixels forming the inactive active areas using one of the approaches described above. The pixels of the inactive areas may be, for example, a constant shade of grey with a brightness that varies with the estimated average brightness of selected pixels in the active area of the display.

The foregoing specification and the drawings depict exemplary embodiments of the best mode(s) of practicing the invention, and elements or steps of the depicted best mode(s) exemplify the elements or steps of the invention as recited in the appended claims.

The invention claimed is:

1. A method for generating successive frames of a video display in response to first pixel data describing an image, wherein each frame comprises an active area of first pixels forming the image, and second pixels outside of the active area, wherein the first pixel data indicates magnitudes of at least one of luminance and chrominance of each first pixel of each successive frame, the method comprising the steps of, for each particular frame of the successive frames:

processing the first pixel data to calculating a first estimated magnitude of at least one of luminance and chrominance of a selected first group of the first pixels;

generating second pixel data indicating magnitudes of said at least one of luminance and chrominance of second pixels of the particular frame, wherein the indicated magnitude of said at least one of luminance and chrominance of each second pixel of the particular frame is a function of the first estimated magnitude;

setting said at least one of luminance and chrominance of the first pixels of the particular frame to magnitudes indicated by the first pixel data; and setting said at least one of luminance and chrominance of the second pixels of the particular frame to magnitudes indicated by the second pixel data.

2. The method in accordance with claim 1 wherein the selected first group of first pixels comprises all first pixels of the active area of at least one frame.

3. The method in accordance with claim 1 wherein the selected first group of first pixels comprises a representative sample of all pixels of the active area of at least one frame.

4. The method in accordance with claim 1 wherein the selected first group of first pixels comprises first pixels that are proximate to the second pixels.

5. The method in accordance with claim 1 wherein the selected first group of first pixels comprises first pixels included in more than one of the frames.

6. The method in accordance with claim 1 further comprising the step of: processing the first pixel data to determine a second estimated magnitude of another of luminance and chrominance of a second selected first group of the first pixels, wherein the magnitude of another of said luminance and chrominance magnitude of each second pixel of the particular frame indicated by the second pixel data is a function of the second estimated magnitude.

7. The method in accordance with claim 1 wherein the first estimated magnitude is one of a mean, median and mode of magnitudes of said at least one of luminance and chrominance of first pixels forming the active area of the at least one frame of the video display.

8. The method in accordance with claim 7 wherein the first estimated magnitude is a mean of magnitudes of said at least one of luminance and chrominance of first pixels forming the active area of the at least one frame of the video display.

9. The method in accordance with claim 1 wherein the magnitude of said at least one of luminance and chrominance of each second pixel of the particular frame is a function of both the first estimated magnitude, a distance of the second pixel from the active area, and a magnitude of said at least one of luminance and chrominance of a nearest first pixel.

10. The method in accordance with claim 1 wherein a magnitude B(A) of said at least one of said luminance and chrominance of each particular second pixel of the particular frame is $$B(A)=(B'-BR(0))(A/A2_{max})^{T1}+BR(0), \text{ for } A<A_{max}$$

$$B(A)=B' \text{ for } A>=A_{max}$$

where BR(0) is a magnitude of said at least one of said luminance and chrominance of a particular one of the first pixels, where A is a measure of distance of the particular second pixel from the particular one of the first pixels, where $A_{max}$ is a constant larger than 0, where B' is the first estimated magnitude of said at least one of said luminance and chrominance of the first group of first pixels, and where T1 is any number such that T1>0.

11. The method in accordance with claim 1 wherein the second pixel data indicates the magnitude of the chrominance of all second pixels of the first frame is a constant that is independent of chrominance of any first pixel.

12. The method in accordance with claim 1 further comprising the step of: processing the first pixel data to determine a second estimated magnitude of chrominance of a second selected first group of the first pixels, wherein the second pixel data indicates that the chrominance of each second pixel of the particular frame is the second estimated magnitude.

13. The method in accordance with claim 1 wherein said at least one of said luminance and chrominance is luminance, and wherein the second pixel data indicates the magnitude of the chrominance of all second pixels of the particular frame is a constant determined other than as a function of chrominance of any first pixel.

14. The method in accordance with claim 13 wherein all second pixels of the particular frame are set grey in color.

15. An apparatus for generating successive frames of a video display in response to first pixel data describing an image, wherein each frame comprises an active area of first pixels forming the image, and second pixels outside of the active area, wherein the first pixel data indicates magnitudes of at least one of luminance and chrominance of each first pixel of each successive frame, the apparatus comprising
- a first circuit for processing the first pixel data to periodically calculate a first estimated magnitude of said at least one of luminance and chrominance of a selected first group of the first pixels;
- a second circuit for generating second pixel data indicating magnitudes of at least one of luminance and chrominance of all second pixels of each frame, wherein the indicated magnitude of said at least one of luminance and chrominance of each second pixel of each frame is a function of a first estimated magnitude determined by the first circuit; and
- a third circuit for setting said at least one of luminance and chrominance of the first pixels of each frame to magnitudes indicated by the first pixel data, and for setting said at least one of luminance and chrominance of the second pixels of each frame to magnitudes indicated by the second pixel data.

16. The apparatus in accordance with claim 15 wherein the selected first group of first pixels comprises all first pixels of the active area of at least one frame.

17. The apparatus in accordance with claim 15 wherein the selected first group of first pixels comprises a representative sample of all pixels of the active area of at least one frame.

18. The apparatus in accordance with claim 15 wherein the selected first group of first pixels comprises first pixels that are proximate to the second pixels.

19. The apparatus in accordance with claim 15 wherein the selected first group of first pixels comprises first pixels included in more than one of the frames.

20. The apparatus in accordance with claim 15 further comprising a fourth circuit for processing the first pixel data to determine a second estimated magnitude of another of luminance and chrominance of a second selected first group of the first pixels, wherein the magnitude of another of said luminance and chrominance magnitude of each second pixel indicated by the second pixel data is a function of the second estimated magnitude.

21. The apparatus in accordance with claim 15 wherein the first estimated magnitude is one of a mean, median and mode of magnitudes of said at least one of luminance and chrominance of first pixels forming the active area of the at least one frame of the video display.

22. The apparatus in accordance with claim 21 wherein the first estimated magnitude is a mean of magnitudes of said at least one of luminance and chrominance of first pixels forming the active area of the at least one frame of the video display.

23. The apparatus in accordance with claim 15 wherein the magnitude of said at least one of luminance and chrominance of each second pixel of the particular frame is a function of both the first estimated magnitude, a distance of the second pixel from the active area, and a magnitude of said at least one of luminance and chrominance of a nearest first pixel.

24. The apparatus in accordance with claim 15 wherein a magnitude B(A) of said at least one of said luminance and chrominance of each particular second pixel of the particular frame is $B(A)=(B'-BR(0)')(A/A2_{max})^{T1}+BR(0)$, for $A<A_{max}$ $B(A)=B'$ for $A>=A_{max}$ where BR(0) is a magnitude of said at least one of said luminance and chrominance of a particular one of the first pixels, where A is a measure of distance of the particular second pixel from the particular one of the first pixels, where $A_{max}$ is a constant larger than 0, where B' is the first estimated magnitude of said at least one of said luminance and chrominance of the first group of first pixels, and where T1 is any number such that T1>0.

25. The apparatus in accordance with claim 20 wherein the second pixel data indicates the magnitude of the chrominance of all second pixels of the first frame is a constant that is independent of chrominance of any first pixel.

26. The apparatus in accordance with claim 15 wherein said at least one of said luminance and chrominance is luminance, and wherein the second pixel data indicates the magnitude of the chrominance of all second pixels of the particular frame is a constant determined other than as a function of chrominance of any first pixel.

27. The apparatus in accordance with claim 26 wherein all second pixels of the particular frame are set grey in color.

28. A method for processing a source frame describing an image to generate a destination frame, the destination frame comprises an active area of first pixels forming the image and second pixels outside of the active area, the method comprising:
- calculating an estimated magnitude of a selected first group of the first pixels according to first pixel data indicating magnitudes of at least one of luminance and chrominance of each a plurality of pixels of the source frame;
- generating second pixel data indicating magnitudes of said at least one of luminance and chrominance of second pixels of the destination frame according to the estimated magnitude; and generating the second pixels of the destination frame according to the second pixel data.

29. The method in accordance with claim 28 wherein the selected first group of first pixels comprises a representative sample of the source frame.

30. The method in accordance with claim 28 wherein the selected first group of first pixels comprises first pixels that are proximate to the second pixels.

* * * * *